(No Model.) 6 Sheets—Sheet 3.

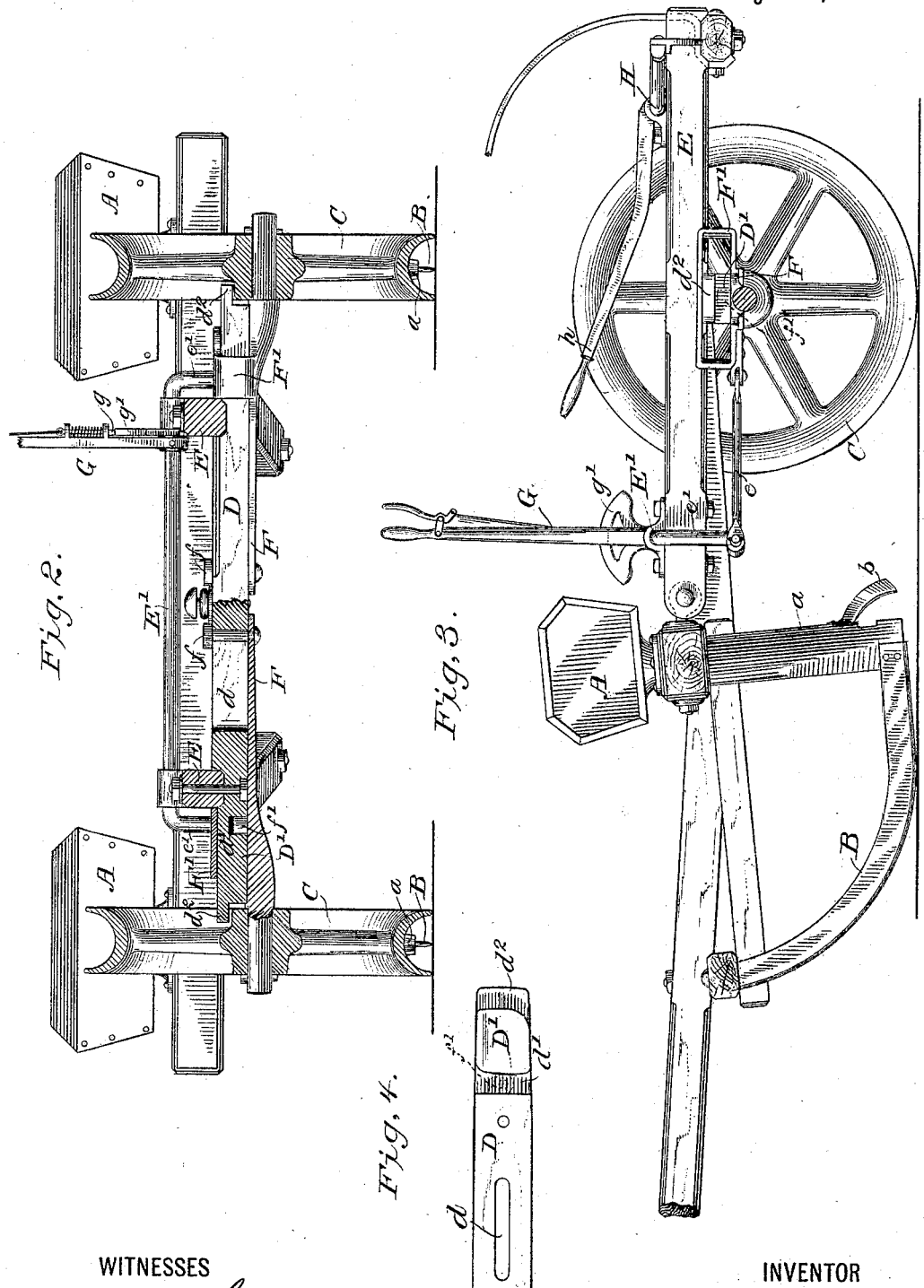

L. A. SCOVIL.
CORN PLANTER.

No. 298,782. Patented May 20, 1884.

WITNESSES
Wm A. Skinkle
Geo W Young

INVENTOR
Lyman A. Scovil.
By his Attorneys
Baldwin, Hopkins & Peyton.

(No Model.)  
6 Sheets—Sheet 4.

L. A. SCOVIL.
CORN PLANTER.

No. 298,782. Patented May 20, 1884.

WITNESSES  
Wm A. Skinkle  
Geo. W. Young

INVENTOR  
Lyman A. Scovil.  
By his Attorneys (No Model.) 6 Sheets—Sheet 5.
L. A. SCOVIL.
CORN PLANTER.

No. 298,782. Patented May 20, 1884.

WITNESSES
Wm. A. Skinkle
Geo. W. Young

INVENTOR
Lyman A. Scovil.
By his Attorneys

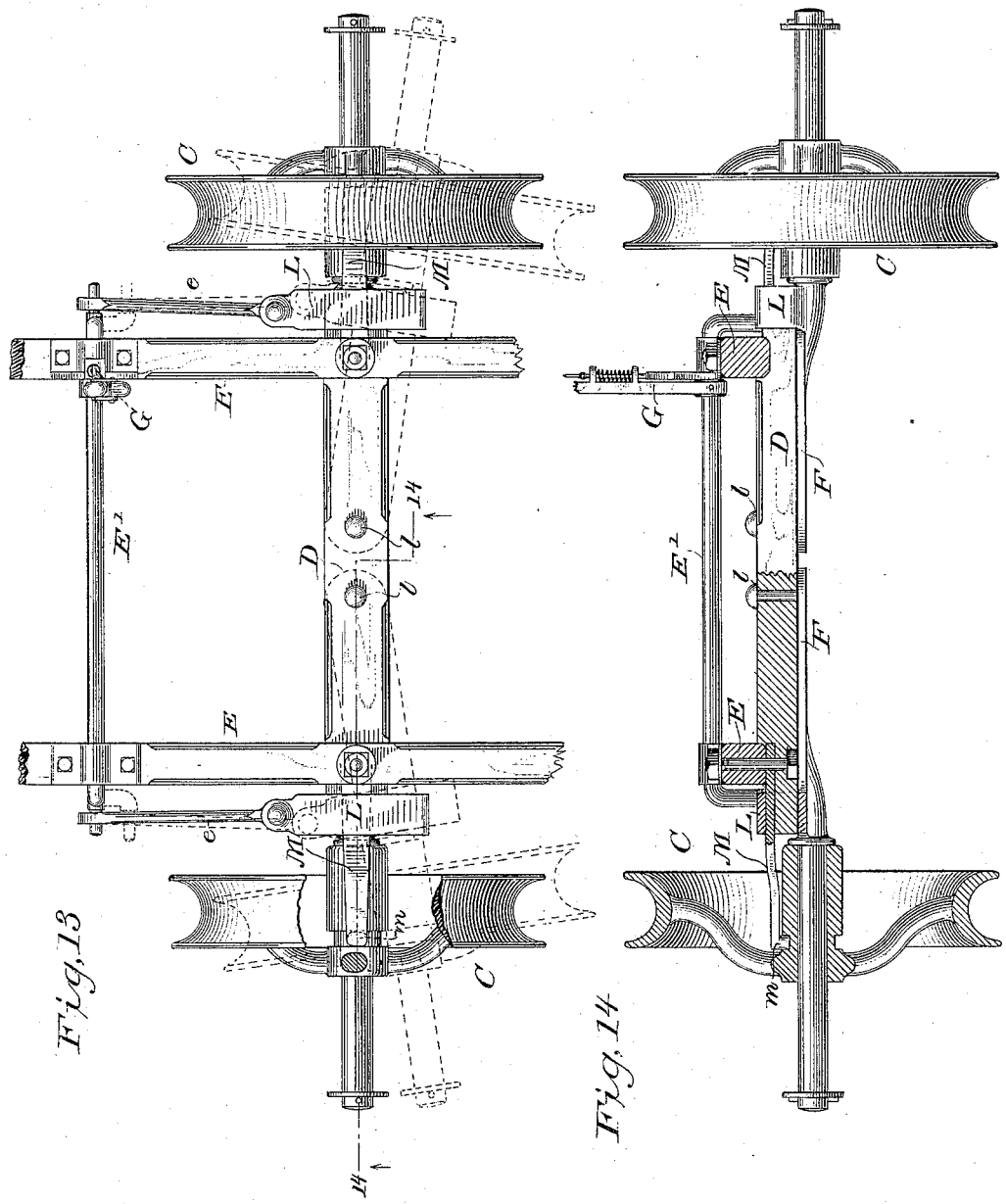

UNITED STATES PATENT OFFICE.

LYMAN A. SCOVIL, OF WILLIAMSPORT, OHIO.

CORN-PLANTER.

SPECIFICATION forming part of Letters Patent No. 298,782, dated May 20, 1884.

Application filed February 12, 1884. (No model.)

*To all whom it may concern:*

Be it known that I, LYMAN A. SCOVIL, of Williamsport, in the county of Pickaway and State of Ohio, have invented certain new and useful Improvements in Corn-Planters, of which the following is a specification.

My invention relates to improvements in planters of the class in which are employed runners for opening trenches into which the seed is dropped, and covering-wheels following in the lines of the trenches for packing the soil upon the seed in the parallel rows.

My object is to provide means whereby the covering-wheels may be thrown out of line with the trenches, so as not to cover the seed therein, and be brought back into line when desired to perform their usual functions, in this way enabling the driver of the machine to leave the seed in very wet ground uncovered, thus avoiding the "baking" of the soil upon the seed, which frequently results from covering them and pressing down the soil in wet sticky land.

Figure 1:
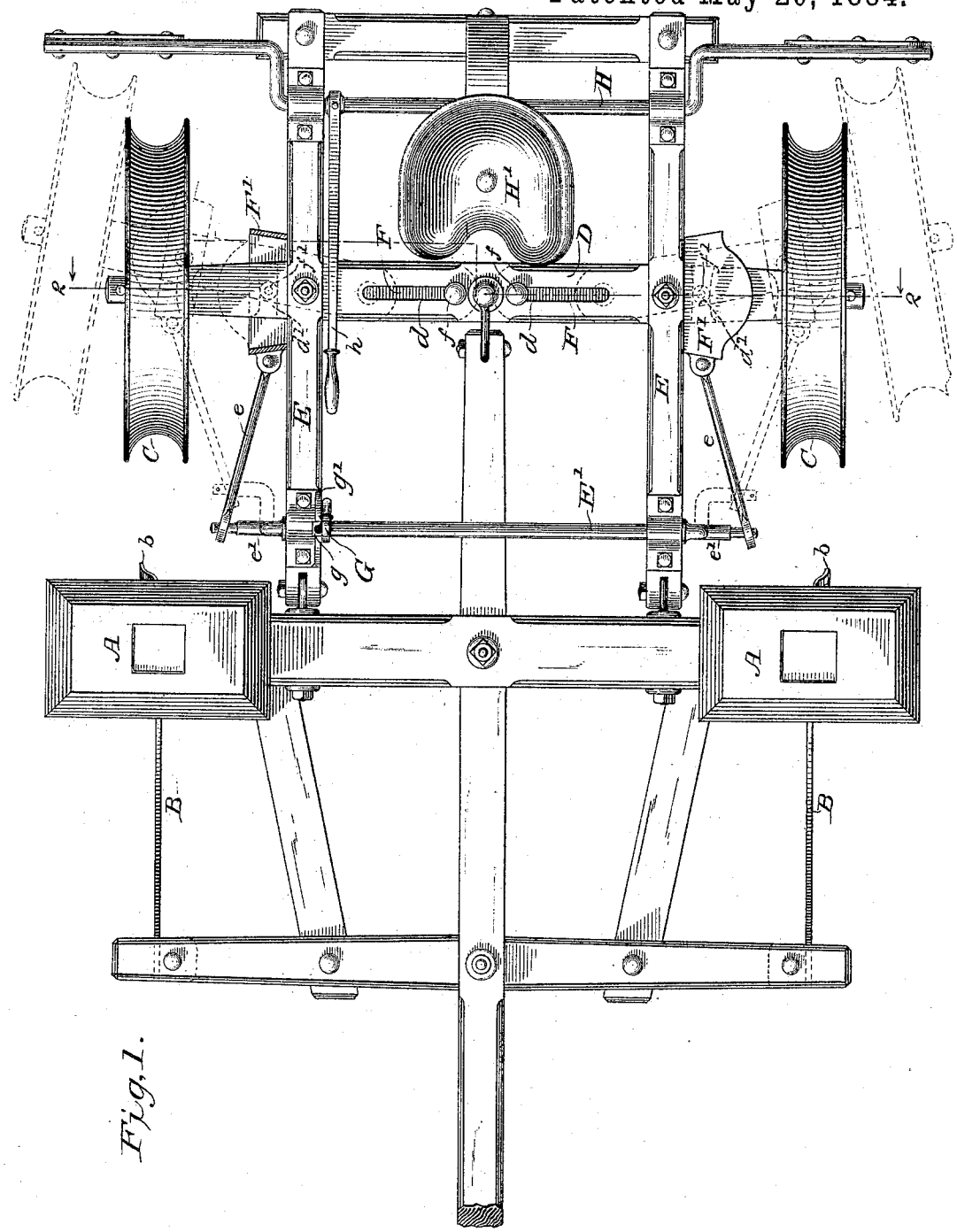
Figure 6:
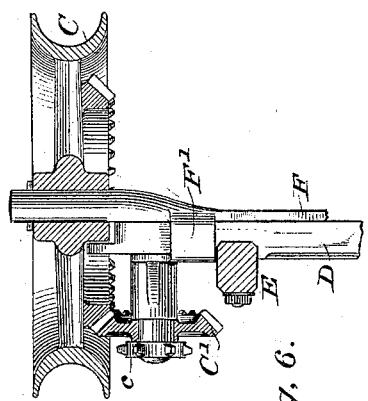
Figure 5:
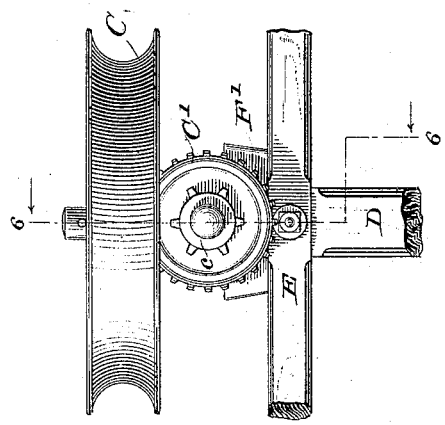
Figure 7:
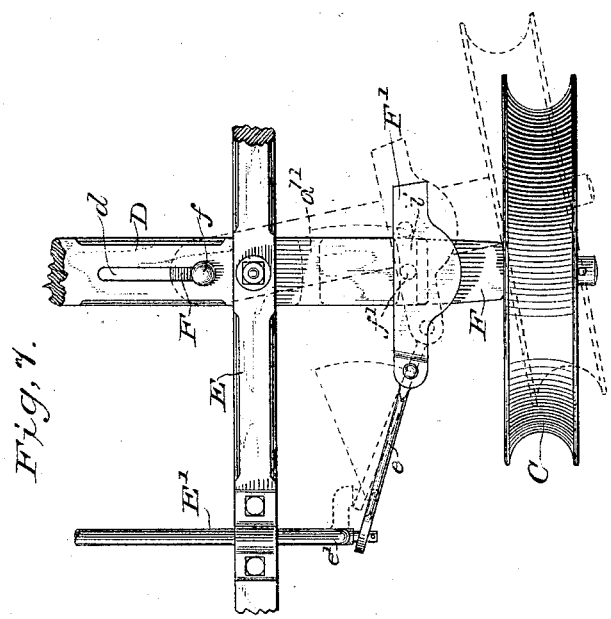
Figures 11, 12:
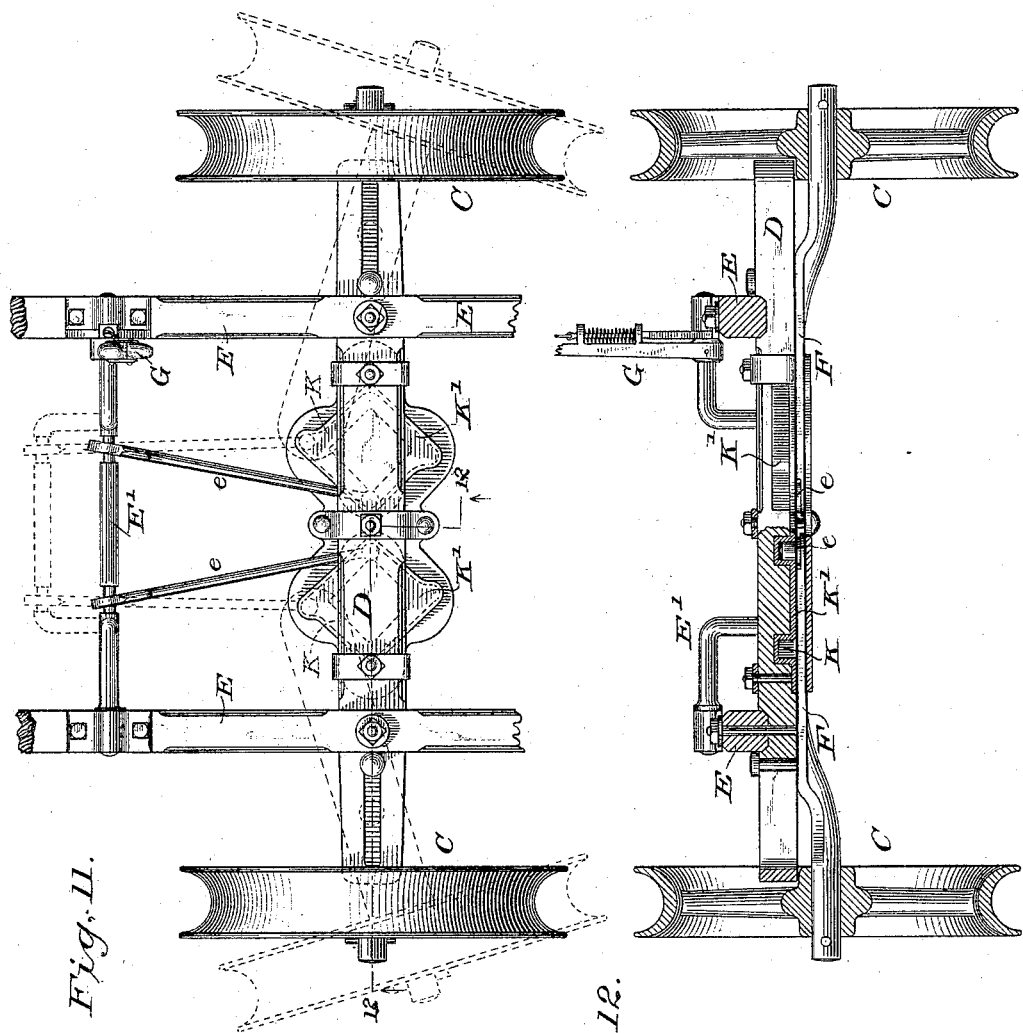

In the accompanying drawings, which show those parts of a corn-planter of well-known type, illustration of which is required to convey the proper understanding of my improvements, and some modifications thereof, Figure 1 is a plan view. Fig. 2 is a view partly in rear elevation and partly in section on the line 2 2 of Fig. 1. Fig. 3 is a side elevation with parts in longitudinal section. Fig. 4 is a bottom view of a portion of the axle-tree beam or cross-bar of the machine with which the independent adjustable axle-arms have connection. Fig. 5 is a plan view showing details of the gearing for actuating the seed-dropping devices, and Fig. 6 a vertical section on the line 6 6 of Fig. 5. Fig. 7 represents a portion of the machine with the wheel-adjusting mechanism slightly modified, and Fig. 8 a view of the same modification with the parts in different position. Fig. 9 is a plan view of a portion of the machine, representing another modification; and Fig. 10 is a view partly in rear elevation and partly in section on the line 10 10 of Fig. 9. Fig. 11 is a plan view of a portion of the machine, representing another modification; and Fig. 12, a view partly in rear elevation and partly in section on the line 12 12 of Fig. 11. Fig. 13 is a plan view, with parts broken away, of another modification; and Fig. 14, a view partly in rear elevation and partly in section on the line 14 14 of Fig. 13.

Referring first to Figs. 1 to 6, inclusive, of the drawings, which show the preferred construction of a corn-planter, the general features of which are well known, A A represent the seed-hoppers, and B B the runners or trench-openers, to the heels of which the grain passes down tubes $a\ a$, and is slightly covered by a thin slice of earth turned over by teeth $b\ b$. These teeth are of such size and shape as to turn over very little soil, and their employment is not absolutely necessary, although preferable, so that the grain will not be left entirely uncovered in event of the frame-supporting and seed-covering wheels C C being thrown out of action, as presently to be described.

The seed-slides or grain-distributing devices are actuated by suitable connections with gearing. In Figs. 5 and 6 gearing for this purpose, actuated by one of the covering-wheels, is represented, the driven gears $C'\ c$ being supported in such manner as to partake of the movements of adjustment of the wheel. The axle-tree beam D is suitably secured crosswise of the wheel-frame E, and the adjustable axle-arms F F are connected with the axle-tree beam and operated as now to be described. Intermediate its ends and center the axle-tree beam is provided with two slots, $d\ d$, extending lengthwise thereof, and near its ends two transverse grooves, $d'$ $d'$, are formed in the under side of the axle-tree beam, the extreme ends of this beam being cut away at its under side, leaving overhanging lips $d^2\ d^2$ with uncut portions $D'\ D'$ between said lips and transverse grooves, the edges of these solid portions $D'$ being irregular or cam-shaped, as plainly shown by Fig. 4. Each of the grooved supporting and covering wheels is mounted upon a journal at the outer end of its axle-arm F, and at their inner ends these arms are provided with pins or bolts $f$, working in the slots $d$ of the axle-beam, beneath which the inwardly-projecting flat or plate-like portions of the axle-arms work. Each of these arms is provided with a short rounded lug, $f'$, projecting upwardly from about midway between its front and rear edges near the inner end of its journal, and with a fixedly-attached bracket-yoke or supporting-slide, $F'$, loosely embracing the axle-beam. The lug $f'$, it should be noticed, is midway between the front and rear ends of the bracket-yoke, and the distance between this lug and either end of the yoke is about equal to or very slightly in excess of the width of the axle-beam. Each bracket-yoke is connected by a link-rod, $e$, to a cranked rock-shaft, $E'$, mounted to turn in suitable bearings at the front ends of the side bars of the wheel-frame. The link-rods are pivotally connected at their opposite ends, respectively, with the cranks $e'\ e'$ at the ends of the rock-shaft outside the frame, and with lugs at the front ends of the bracket-yokes. A lever, G, rigidly connected to the cranked rock-shaft, projects upwardly therefrom near one side of the wheel-frame, and is provided with a detent-slide, $g$, to engage with a notch in a detent-plate, $g'$.

From the above description it will be understood that when it is desired to spread the wheels apart, to throw them out of line with the trenches in which the seed is deposited, the operation will be as follows: The driver, by means of the lever G, rocks the crank-arms of the rock-shaft backward, throwing the lugs $f'$ on the axle-arm plates rearwardly out of the transverse slots $d'$, with which they normally engage, and by this movement simultaneously and correspondingly inclines these arms to the rear as they rock about their guide-pins at their inner ends. The natural tendency of the wheels, when they are both thus inclined to the rear, being to simultaneously move outward, or away from the central line of draft, they next assume the positions in which they are represented in dotted lines, the pins at their inner ends running outward to the outer ends of their respective guide-slots in the axle-beam, and the lugs $f'$ traversing along the rear of the axle-beam toward its ends. As soon as these traversing lugs reach the rounded rear corners of the solid portions $D'$ of the axle-beam, the driver, by throwing forward and downward the rock-shaft arms, draws the lugs along beneath the grooved or overhanging ends of the axle-beam, and the parts are secured temporarily in this position by locking the lever with its detent devices. When each lug $f'$ comes to rest, with the wheels in the position last referred to, it is at the end and about midway between the front and rear edges of the axle-beam. With the parts in this position the grain which is deposited in the furrows or trenches will be covered only to a very slight extent by the teeth at the rear of the runners, as before explained, and in this way the packing of the wet and sticky soil by the weight of the covering-wheels, so as to cause baking of the ground, is avoided.

In restoring the parts to their working positions a reversal of the above-described operations is required, the axle-arms being first drawn forward at their outer ends by corresponding movement imparted to the cranks of the rock-shaft by moving its lever backward. The wheels then run inward as the machine advances, and their axle-arms are moved into position to have their traversing lugs engage the transverse slots, into which they project when the wheels are in working position, and locked by the lever and detent devices.

In order that the wheels may be prevented from clogging, both when in their working positions and when thrust out of line with the seed-trenches, I provide a cranked rock-bar, H, provided with a series of scrapers at its ends, at such distances apart that the wheels will be engaged by the scrapers, both when in their normal position and when spread apart to avoid covering the grain. A lever, $h$, serves to operate the scrapers, as will readily be understood, this lever, as well as the lever of the wheel-adjusting rock-shaft, being within convenient reach of the driver in his seat $H'$.

The before-described gears $C'\ c$ are secured to shafts rotating in sleeves formed with or attached to the bracket-yokes $F'$, so that by suitable connections with the seed-distributing devices the planting may be continued when the wheels are thrown out of line and spread apart.

Various mechanical devices may be employed in lieu of those above described, and which I deem preferable, for moving the wheels inward and outward.

I do not wish to be understood as confining my invention to mere details of construction and arrangement, and consequently I will describe some of the equivalent devices constituting mere modifications of my improvements which may be employed.

Figure 8:
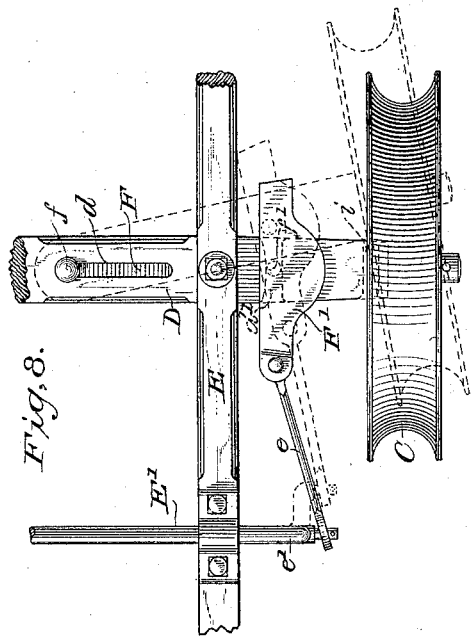
Figures 9, 10:
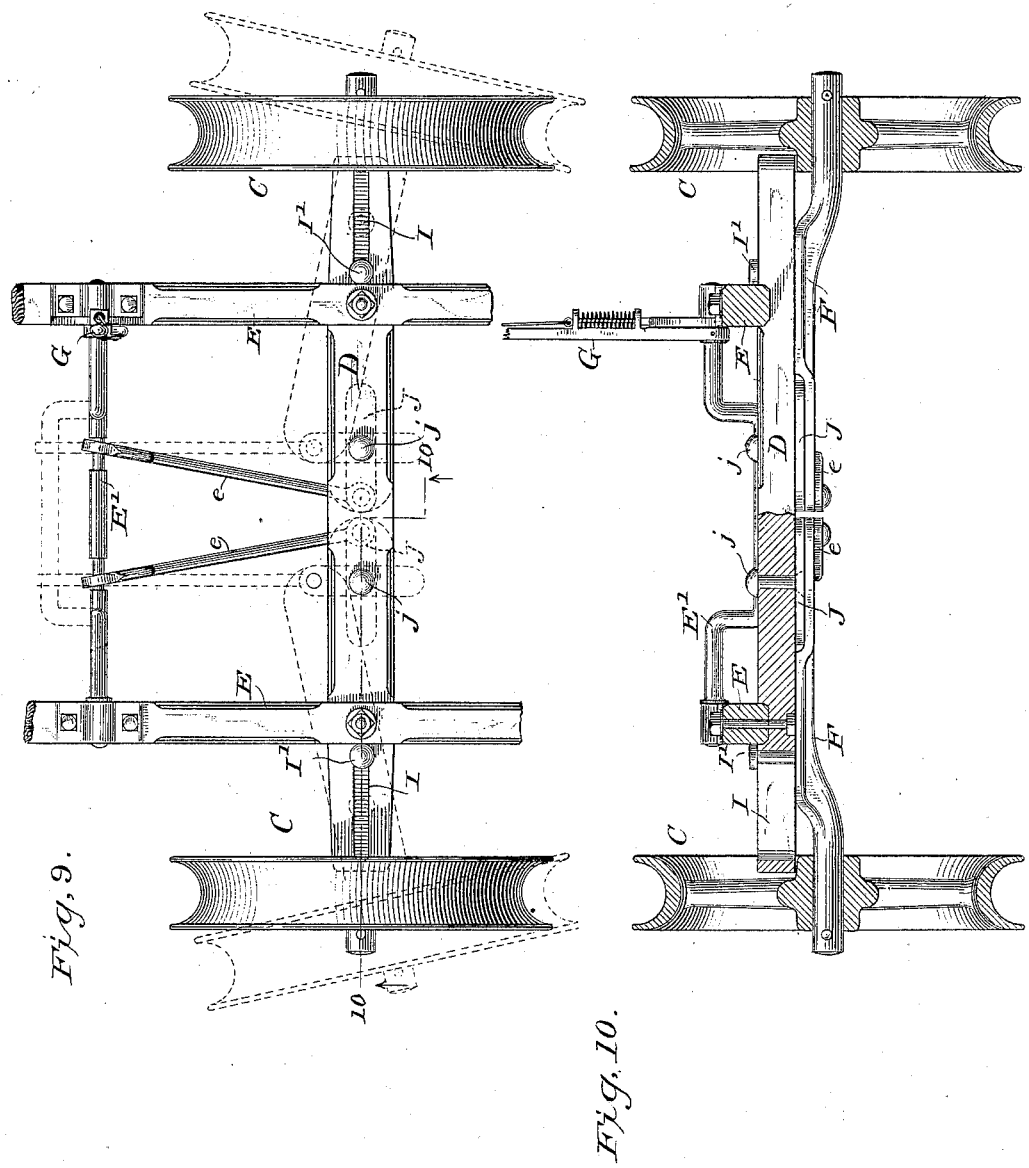

In Figs. 7 and 8 the axle-beam is constructed substantially as above described, except that instead of the overhanging end portion or lips, $d^2\ d^2$, a groove, $i$, is provided near each end of the axle-beam, and the bracket-yokes are made of somewhat greater length than before, so that the guide-lugs $f'$ will be at distances sufficiently far from the opposite ends of these yokes to enable them to slide loosely upon the axle-beam and move in curved lines, instead of being confined to a straight reciprocatory movement, as before. The rock-shaft $E'$ is, as before, provided with a lever and detent devices and link-rods connecting its ends with the bracket-yokes, and the jointed connections between the front ends of the link-rods and the cranks of the rock-shaft are sufficiently loose to allow of horizontal vibration of these rods about their connections with the cranks. In accordance with this modification it will be seen that in inclining the axle-arms the driver controls the movements of the arms by means of the rock-shaft, instead of having the arms controlled, when sliding in and out, by reason of the axle-beam being embraced closely at front and rear by the lugs $f'$ and the ends of the bracket-yokes, as before. As will be best understood by reference to dotted lines, Fig. 7, it will be seen that when the axle-arms are inclined to the rear the wheels will run outward until the guide-lugs reach the outer grooves, when the driver manipulates the rock-shaft so as to bring the lugs to the centers of the grooves. To cause the wheels to move toward the center, the bracket-yokes are pulled forward until the guide-lugs are freed from the outer grooves and by their inward movement come to a position of rest in the centers of the inner transverse grooves, when the parts are locked in position by the lever and detent devices.

Figs. 9 and 10 represent a modification in which the cranked rock-shaft is located between the longitudinal beams of the wheel-frame E, and the axle-beam provided near its outer ends with slots I, running lengthwise thereof, through which project sliding pivot pins or bolts I', secured to the axle-arms. At their inner ends these arms are pivoted, respectively, to the ends of links J J, which are centrally pivoted by means of the bolts $j$ $j$ to the under side of the axle-beam. Links connect the rock-shaft crank with those ends of the above-mentioned pivoted links to which the axle-arms are pivoted. From the above description it will be seen that by means of the lever on the rock-shaft the driver can pull forward the inner ends of the axle-arms, so as to give these arms the proper inclination (see dotted lines, Fig. 9) to cause the wheels to spread apart. The forward pull upon the pivoted links is sufficient to give them about a quarter-turn to bring the wheels in position to spread, and by the outward movement these links are given another quarter-turn, bringing them parallel with the axle-beam. In moving the axle-arms into position to cause the wheels to move toward the center, the pivot-links are rocked backward a quarter-revolution, and the inward movement of the wheels brings these links to their normal or starting position.

By the modification shown in Figs. 11 and 12, two cam-grooves, K K, are employed, by means of which the adjustment of the wheels is rendered positive. These cam-grooves are formed in the under surface of a plate or casting, K', bolted to the under side of the axle-beam. Longitudinal slots near the outer ends of the axle-beams are provided, as last above explained, and the axle-arms at their inner ends have link-connection with the rock-shaft. It should be noticed that the shape of the cam-grooves is such that when the axle-arms are brought into the position in which they are represented in dotted lines by a forward rock of the crank-shaft the guide-lugs on these arms will be moved into the front rounded corners of their respective cam-grooves, and that subsequently the wheels will be adjusted into position such as to bring the guide-lugs to the outer corners of the cam-grooves, where the parts are secured by the lever and detent devices. To restore the parts to their normal positions the rock-shaft is actuated in such way as to thrust the link-rods backward and bring the guide-lugs into the rear rounded corners of the cam-grooves, after which the wheels approach the center until the starting-point is reached, and the parts are secured in working position. It will be seen that the adjustment may be positively controlled throughout, if necessary, though ordinarily, after unlocking and starting the rock-shaft, the guide-lugs will move forward to the front corners of the grooves, from which position they are moved positively to the outer corners by the attendant, assisted by the tendency of the wheels to run outward, and that in moving the wheels inward the lugs have to be moved positively to the rear corners of the grooves, from whence they move automatically, as a rule, to the starting-point.

In the modification shown by Figs. 13 and 14, the journals of the axle-arms are elongated, being shown as made of a length nearly twice that of the wheel-hubs. The cranked ends of the rock-shaft are connected with the respective axle-arms by means of loops or yokes L, which are rigidly connected with the arms close to their journals, and are so formed as to embrace the axle-beam and allow of the proper backward and forward movements being imparted to the axle-arms, which are pivoted at their adjacent inner ends by the non-sliding bolts $l\,l$, passing through the axle-beam. Each wheel-hub is provided with an annular groove near its outer end and inside of its dished spokes, into each of which grooves enters a lug, $m$, on an arm, M, secured to the axle-beam.

From the above description it will be seen that when a backward movement is imparted to the axle-arms (see dotted lines, Fig. 13) the wheels will be moved into position to disengage their annular grooves from the interlocking lugs of the retaining-arms, thus leaving the wheels free to move outward along their journals to the limit of their adjustment in this direction, when the lugs of the retaining-arms will be presented to the reduced shouldered portions at the inner ends of the wheel-hubs, and the wheels will come into position at right angles with the axle-beam when the rock-shaft is properly actuated. In bringing the wheels into their working position, a forward movement is imparted to the axle-arms and the wheels move inward until the lugs of the retaining-arms come into register with the annular grooves in the wheel-hubs, and the parts are locked in position by the lever and detent devices of the rock-shaft, as before.

In all the above-described ways of carrying out my invention, and in other equivalent ways which it is not deemed necessary to herein set forth, the covering-wheels, it will be seen, are readily moved away from each other, to avoid covering the grain, and again brought back toward each other in their working position without severe strain upon the strength of the attendant, and a quick adjustment of the wheels is provided for by inexpensive and simple means.

I claim as of my own invention—

1. The combination, substantially as hereinbefore set forth, of the wheel-frame, the axle-beam, the axle-arms having jointed connection with the axle-beam, the adjustable wheels, and means controlled by the attendant for simultaneously and correspondingly inclining the axle-arms, to cause the wheels to move together either inward or outward, whereby they are caused to simultaneously and similarly approach or move away from the central line of draft, for the purpose described.

2. The combination of the trench-openers, the axle-beam in rear thereof, the axle-arms having pivotal connection with the axle-beam, the wheels, the cranked rock-shaft having link-connection with the axle-arms, and its lever and detent devices, substantially as and for the purpose hereinbefore set forth.

3. The combination of the trench-openers, the wheel-frame, the axle-beam, the pivoted axle-arms, the cranked rock-shaft, the adjustable wheels, and the bracket-yokes by which the axle-arms have link-connection with the rock-shaft, substantially as and for the purpose hereinbefore set forth.

4. The combination of the wheel-frame, the axle-beam having longitudinal slots and transverse grooves, the sliding and vibrating axle-arms provided with pivots traversing the longitudinal slots, and guide-lugs working in the transverse grooves, the wheels, the cranked rock-shaft, and its links having connection with the axle-arms, substantially as and for the purpose hereinbefore set forth.

5. The combination of the axle-beam, the sliding and vibrating axle-arm, the gear of the supporting-wheel, and the gears supported by connection with the axle-arm, substantially as and for the purpose hereinbefore set forth.

6. The combination of the runners, the teeth at the heels thereof for slightly covering the grain, the wheel-frame, the axle-beam, the axle-arms having jointed connection with the axle-beam, the adjustable wheels, and means controlled by the attendant for simultaneously and correspondingly inclining the axle-arms either to the rear or to the front, to cause the wheels to move together either inward or outward, whereby the grain may be covered by the teeth only, or by them and the wheels, substantially as and for the purpose hereinbefore set forth.

7. The combination of the wheel-frame, the axle-beam, the axle-arms having jointed connection with the axle-beam, the adjustable wheels, means controlled by the attendant for simultaneously and correspondingly inclining the axle-arms either to the front or to the rear, to cause the wheels to move inward or outward, and the series of scrapers for acting on the wheels in their different positions, substantially as and for the purpose hereinbefore set forth.

In testimony whereof I have hereunto subscribed my name this 11th day of February, A. D. 1884.

LYMAN A. SCOVIL.

Witnesses:
JOSEPH I. PEYTON,
H. A. HALL.